(12) United States Patent
Shinde et al.

(10) Patent No.: US 9,497,151 B2
(45) Date of Patent: Nov. 15, 2016

(54) OPTIMIZATION FRAMEWORK FOR IN-MEMORY STORAGE OF POLICY SESSION DATA

(71) Applicant: Oracle International Corporaton, Redwood Shores, CA (US)

(72) Inventors: Rahul Shinde, Fremont, CA (US); Diwakar Goel, San Francisco, CA (US); Daniel Jansson, San Francisco, CA (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 406 days.

(21) Appl. No.: 14/068,237

(22) Filed: Oct. 31, 2013

(65) Prior Publication Data
US 2015/0120727 A1    Apr. 30, 2015

(51) Int. Cl.
*G06F 17/30* (2006.01)
*H04L 12/58* (2006.01)
*H04M 15/00* (2006.01)

(52) U.S. Cl.
CPC ......... *H04L 51/18* (2013.01); *G06F 17/30722* (2013.01); *H04M 15/56* (2013.01); *H04M 15/57* (2013.01); *H04M 15/66* (2013.01)

(58) Field of Classification Search
CPC .................................................. H04M 15/66
USPC ........................................ 707/E17.032, 736
See application file for complete search history.

(56) References Cited

U.S. PATENT DOCUMENTS

| | | | | |
|---|---|---|---|---|
| 7,340,406 B1* | 3/2008 | Tribble | ................. | G06Q 10/06 705/7.36 |
| 8,924,335 B1* | 12/2014 | Trefler | ................. | G06F 3/0481 706/47 |
| 2004/0243672 A1* | 12/2004 | Markki | ................. | H04L 29/06 709/204 |
| 2005/0246726 A1* | 11/2005 | Labrou | ................. | G06F 9/465 719/328 |
| 2005/0251735 A1* | 11/2005 | Dunietz | ............. | G06F 17/2288 715/255 |
| 2007/0041532 A1* | 2/2007 | Salonen | ................ | G06Q 50/06 379/114.2 |
| 2007/0245128 A1* | 10/2007 | Gray | ................. | G06F 9/30003 712/214 |
| 2007/0245309 A1* | 10/2007 | Gray | ................. | G06F 9/30047 717/115 |
| 2008/0040551 A1* | 2/2008 | Gray | .................... | G06F 12/084 711/130 |

* cited by examiner

*Primary Examiner* — Baoquoc N To
(74) *Attorney, Agent, or Firm* — Precision IP

(57) ABSTRACT

The present disclosure provides for an optimization framework that optimizes the amount of information persisted in a policy session using rule introspection. In one embodiment, the optimization framework receives a message, where the message includes an attribute, and the attribute includes an attribute name and an attribute value. The optimization framework consults a mapping table to determine persistence behavior associated with the attribute name. The optimization framework persists the attribute in a rule field cache, according to the persistence behavior. In one embodiment, the persistence behavior includes a persistence type, a persistence mode, and/or custom persistence logic, which specify how the attribute should be persisted. In one embodiment, the optimization framework also provides for performing rule introspection and rule evaluation of decision rules.

21 Claims, 10 Drawing Sheets

Interface1
205(1)

-AttributeA
-AttributeB [1..*]
-AttributeC [0..1]
-AttributeD [0..*]

Interface2
205(2)

-AttributeP
-AttributeQ [1..*]
-AttributeR [0..*]
--AttributeS
-AttributeT

InterfaceN
205(N)

-AttributeX
-AttributeY
-AttributeZ
--AttributeM
----AttributeG

Rule 1
290(1)

IF1
--Field_a
IF2
--Field_p
...
If IF1.Field_a = "Value1" and
IF2.Field_p = "Value_A"
Then Install Policy_A Mapping Table
260

| | Attribute Name 310 | Rule Field Name 320 | Persistence Type 330 | Persistence Mode 340 |
|---|---|---|---|---|
| Entry 305(1) | Interface1.AttributeA | IF1.Field_a | Dynamic | Append |
| Entry 305(2) | Interface1.AttributeB | IF1.Field_b | Dynamic | Overwrite |
| ... | | | | |
| Entry 305(20) | Interface2.AttributeP | IF2.Field_p | Always | Custom |
| ... | | | | |
| Entry 305(100) | InterfaceN.AttributeZ | IFN.Field_z | Never | |

Figure 3

OPTIMIZATION FRAMEWORK FOR IN-MEMORY STORAGE OF POLICY SESSION DATA

FIELD OF THE INVENTION

The present invention relates to policy and charging control (PCC) systems, and more particularly, to optimizing storage and access of policy session data.

BACKGROUND OF THE INVENTION

Communications Service Providers (CSPs) are experiencing an explosion of network data usage that is degrading the customer experience and undermining traditional telecommunications business models. Policy solutions often implemented by CSPs to regain control over network data usage are punitive in nature, are expensive to implement, and do not easily scale. A policy and charging control (PCC) solution has been developed under 3GPP™ (3rd Generation Partnership Project) IMS (Internet Protocol Multimedia Subsystems) and provides a new standard for telecommunications business models.

SUMMARY OF THE INVENTION

The present disclosure provides for an optimization framework that optimizes the amount of data or information persisted in a policy session using rule introspection. In one embodiment, the optimization framework receives a message, where the message includes an attribute, and the attribute includes an attribute name and an attribute value. The optimization framework consults a mapping table to determine persistence behavior associated with the attribute name. The optimization framework persists the attribute in a rule field cache, according to the persistence behavior. In one embodiment, the persistence behavior includes a persistence type, a persistence mode, and/or custom persistence logic, which specify how the attribute should be persisted. In one embodiment, the optimization framework also provides for performing rule introspection and rule evaluation of decision rules.

BRIEF DESCRIPTION OF THE DRAWINGS

The present invention may be better understood, and its numerous objects, features and advantages made apparent to those skilled in the art by referencing the accompanying drawings.

FIG. 3 is a simplified block diagram illustrating components of an example mapping table, according to one embodiment.

Figure 1:
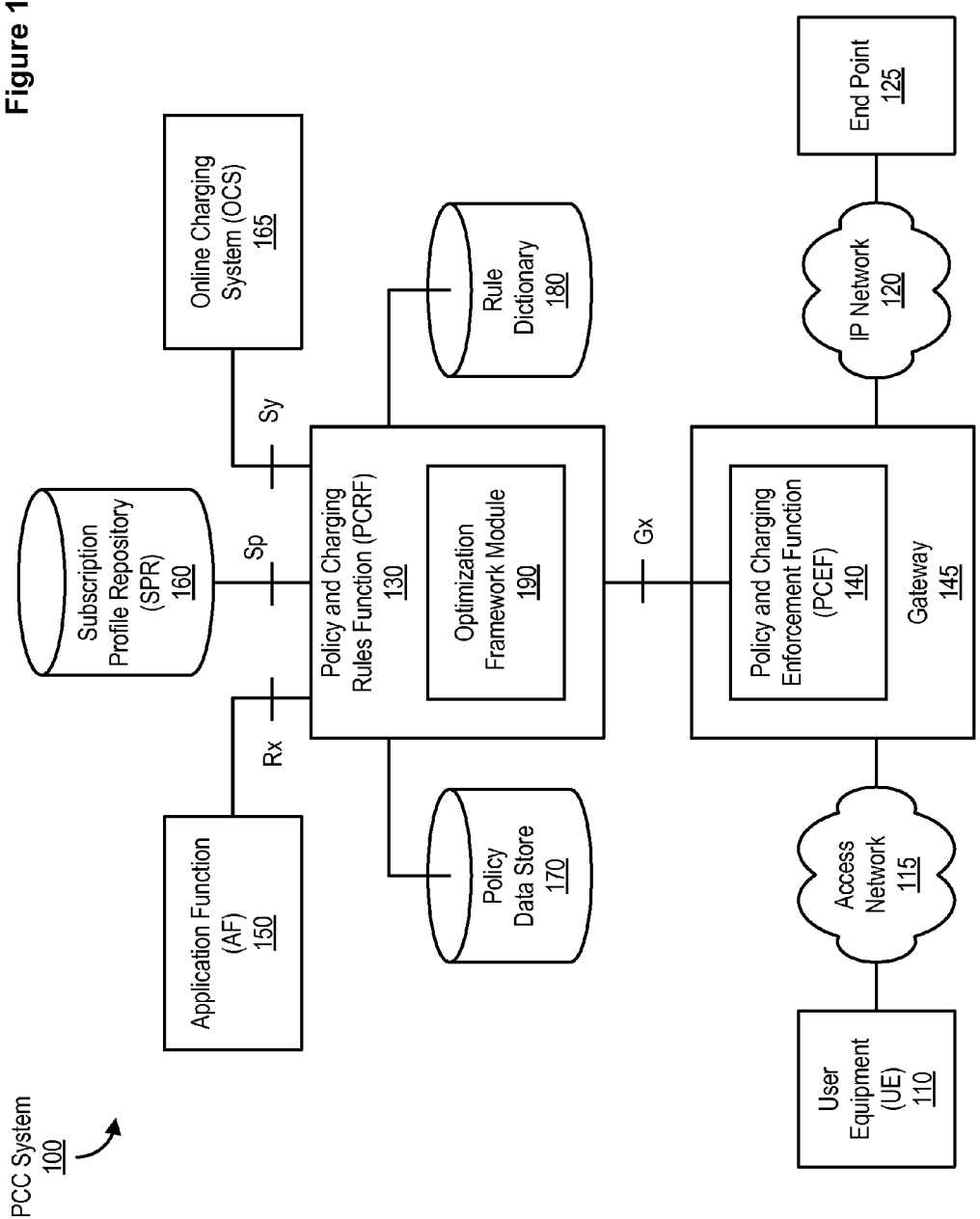
FIG. 1 is a simplified block diagram illustrating components of an example policy and charging control (PCC) system in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents, and alternatives falling within the spirit and scope of the present disclosure as defined by the appended claims.

DETAILED DESCRIPTION

FIG. 1 is a simplified block diagram illustrating components of an example policy and charging control (PCC) system in which the present disclosure can be implemented. A network operator, such as a communications service provider (CSP), provides subscribers with access to a variety of services (such as voice over Internet Protocol (VoIP), file transfer protocol (FTP) service, streaming video service, and the like) over a core network, such as an IP (Internet Protocol) Multimedia Subsystem (IMS). A network operator can implement a PCC system 100 in the core network to define and enforce conditions for service usage (e.g., how services can be used by subscribers) and charging (e.g., how subscribers should be charged for service usage).

As illustrated, user equipment 110 (or a computing device) of a subscriber is configured to communicate with PCC system 100 via an access network 115 in order to access services provided by an IP network 120. Examples of IP network 120 include the network operator's core network, an external network (or packet data network), and an access network (which can be access network 115 or a different access network). As part of the service, user equipment 110 may access an end point 125 (or a computing device) providing the service (e.g., a source of data requested by the subscriber, such as an application server, another subscriber's user equipment, and the like).

As illustrated, PCC system 100 includes a policy and charging rules function (PCRF) 130, a policy and charging enforcement function (PCEF) 140, a gateway 145, an application function (AF) 150, a subscriber profile repository (SPR) 160, and an online charging system (OCS) 165. PCRF 110 also has access to a policy data store 170 and a rule dictionary 180. PCC system 100 may also include other components not illustrated, such as a bearer binding and event reporting function (BBERF), a traffic detection function (TDF), an offline charging system (OFCS), and the like. The components of PCC system 100 are configured to communicate with one another according to a PCC system communications standard, such as the 3GPP™ (3rd Generation Partnership Project) standard. PCC system components communicate via interfaces based on Diameter protocol (an Authentication, Authorization, and Accounting (AAA) protocol).

Each interface supports a set of attributes, where each attribute is represented by an attribute-value pair (AVP). An attribute's AVP includes the attribute's name and the attribute's associated value. One or more attributes are defined on a particular interface between a pair of PCC system components (e.g., an attribute name and associated attribute value type are defined on a particular interface in the PCC system communications standard). AVPs are used to convey information (e.g., attribute values) between the pair of PCC system components. AVPs are carried in messages exchanged between the pair of PCC system components. In particular, various PCC system components are configured to provide information to policy and control rules function (PCRF) 130 using AVPs (e.g., send a message containing one or more AVPs to PCRF 130).

Application function (AF) 150 is application control logic of a service that is provided to subscribers. AF 150 can be located on a computing device, such as an application server. In one embodiment (not shown), AF 150 may also be coupled to IP network 120 and provide data packets related to a particular service (also referred to as a service data flow). As illustrated, PCRF 130 communicates with AF 150 via an Rx interface. AF 150 provides information to PCRF 130 about a requested service, including but not limited to a media type and format of the service, a flow description (e.g., a 5-tuple of a source address, source port number, destination address, destination port number, and protocol identifier that describes a particular service data flow), and a flow status (e.g., whether the service data flow may or may not be forwarded to a subscriber).

Subscriber profile repository (SPR) 160 is a data store (e.g., a database or other organized collection of data located on a storage device) that contains subscriber-related information needed for subscription-based policies (where policies are further discussed below). As illustrated, PCRF 130 communicates with SPR 160 via an Sp interface. SPR 160 provides information to PCRF 130 about a subscriber connecting to a particular IP network 120, including but not limited to a list of service identifiers (IDs) for the subscriber's allowed services, associated charging information (e.g., an identifier of a particular charging plan for a particular service), any guaranteed bandwidth limits, any spending limits (e.g., a total allowed usage per IP network 120 and user equipment 110), and usage monitoring information.

Online charging system (OCS) 165 is a charging engine configured to perform the calculation of charges that arise from a subscriber's service usage. OCS 165 can be located on a computing device, such as a server. As illustrated, PCRF 130 communicates with OCS 165 via an Sy interface. If PCRF 130 is configured to receive information from OCS 165, such information can include, but is not limited to, a subscriber's policy counter status for a number of relevant policy counters, which are used to determine the subscriber's current service usage. Example service usage measurement methods include volume-, time-, and event-based measurement, and a combination of such methods.

Policy and charging enforcement function (PCEF) 140 is configured to enforce any policy and charging control (PCC) decisions made by PCRF 130 and handle service data flows (e.g., forwarding or dropping packets related to a requested service), as further discussed below. PCEF 140 can be located on a computing device, such as a server (e.g., gateway 145). As illustrated, PCRF 130 communicates with PCEF 140 via a Gx interface. PCEF 140 provides information to PCRF 130 about the subscriber and the requested service, including but not limited to a subscriber identifier (ID), an IP address of the subscriber's user equipment, and an identifier of the IP network 120 that provides the requested service.

Policy and charging rules function (PCRF) 130 is a decision engine (e.g., located on a server) that is configured to use decision rules to make policy and charging control (PCC) decisions regarding a service that is requested by a subscriber. Decision rules are defined by a network operator and are stored in rule dictionary 180 (e.g., a data store, such as database or other organized collection of data located on a storage device). A decision rule can be expressed as an IF-THEN statement, where the IF portion includes a condition and the THEN portion includes one or more actions to be performed. A condition includes one or more logical tests can be evaluated to result in a Boolean true or false value. The logical tests can be used to determine whether particular requirements have been met in order to deliver the requested service, such as whether a subscriber has enough credit to access the requested service. PCRF 130 receives information from various PCC system components in the form of attribute-value pairs (AVPs), where the information (or attribute values) is used to determine whether the requirements have been met. Each condition can include one or more data fields, or rule fields, where each rule field is mapped to, or associated with, an attribute. An attribute value (which is carried in the attribute's AVP) can be used as input to an associated rule field, as further discussed below in connection with FIG. 3.

PCRF 130 is configured to evaluate the decision rules in order of rule priority, where PCRF 130 determines the Boolean value of the condition of a given decision rule. When a condition of a decision rule evaluates to Boolean true, PCRF 130 is configured to perform the one or more actions of the decision rule. Often, an action indicates that a particular policy regarding the service should be applied to PCEF 140 or removed from PCEF 140, although other actions may be performed, such as denial of service or application of particular charging parameters. The actions that are performed by PCRF 130 (e.g., the actions of decision rules that have true conditions) are also referred to as PCC decisions.

For PCC decisions that indicate one or more particular policies should be applied to PCEF 140, PCRF 130 is also configured to provision (e.g., install) the particular policies onto policy and charging enforcement function (PCEF) 140. Policies specify details about how a requested service should be handled. Policies are defined by the network operator and are stored in policy data store 170 (e.g., a database or other organized collection of data located on a storage device), although policies related to charging may also be implemented or stored at online charging system 165. For example, policies can indicate whether packets related to a particular service (also referred to as a service data flow) should be forwarded to the subscriber via a particular transmission path or whether a particular charging model should be used to charge for the subscriber's service usage. Policies can be dynamically provisioned (e.g., provisioned on an on-going basis) onto PCEF 140 by PCRF 130 or can be directly provisioned onto PCEF 140 by the network operator (also referred to as pre-defined or pre-installed policies).

PCEF 140 is configured to enforce the provisioned policies (both dynamically provisioned and directly provisioned) using gateway 145, which is a computing device that is a point of control for service data flows. For example, PCEF 140 can control gateway 145 to allow packets of a service data flow from IP network 120 to flow to user equipment 110 or to discard the packets, according to the policies applicable to the service data flow.

The policies and decision rules can be dynamically (e.g., on an on-going basis) changed (e.g., new policies or rules can be added, and existing policies or rules can be removed or modified) by the network operator. PCRF 130 is configured to evaluate the decision rules in response to receipt of new or updated AVPs (e.g., AVPs that include new or updated attribute values) and in response to changes made to decision rules or policies. By evaluating the decision rules, PCRF 130 dynamically determines whether new policies should be provisioned (or an updated policy should replace an existing policy) on PCEF 140, or whether policies that are no longer applicable should be removed from PCEF 140.

Decision rules are evaluated by PCRF 130 with respect to each subscriber, where each subscriber (via user equipment 110) establishes a policy session with PCRF 130 for the requested service. Generally, each subscriber has one or more policy sessions, depending on how many services the subscriber is requesting (e.g., the subscriber has one policy session per requested service). Policy sessions are continuously open once established, and are explicitly closed or terminated. Policy sessions can remain open for days or weeks at a time and the requested service may be used intermittently throughout the duration of the policy session. PCRF 130 manages these policy sessions and persists a number of attributes that are related to each particular policy session (e.g., related to the subscriber and/or service that are associated with the policy session) by storing the attributes' AVPs, where the attribute values of the persisted attributes are available for use as input to the decision rules.

PCRF 130 typically receives hundreds of AVPs containing information about the subscriber, the requested service, and the networks used to deliver the requested service (e.g., access network 115, IP network 120, and/or the core network), which PCRF 130 effectively takes into account when making PCC decisions for subscribers. Traditionally, all AVPs received in a message are first persisted and then the decision rules are evaluated, using the persisted AVPs. However, not every received AVP is necessarily used as input to the decision rules. Thus, if a large number of unused AVPs (e.g., AVPs that are never used in the decision rules) are persisted, the PCRF's computing power and storage space used to persist such unused AVPs are effectively wasted.

Further, the information carried by AVPs is incremental in nature and is updated often, meaning that PCRF 130 should persist (or store) all received information in order to make the most accurate PCC decisions. However, storing each and every received AVP can quickly lead to session bloat and can cause severe degradation in performance as the PCC system performs extensive persistence of the received AVPs before performing rule evaluation. This problem is exacerbated as the PCC system is required to handle ever-increasing service traffic loads (e.g., performing attribute persistence for a greater and greater number of policy sessions, where the storage space required to persist AVPs in each policy session grows larger and larger). In order to maintain performance in such a scenario, additional hardware capacity for processing the service traffic loads and associated policy sessions would be required.

One may attempt to avoid session bloat by avoiding persistence of AVPs altogether, and instead only use the AVPs that arrive in a particular message as input to the decision rules. However, since not all AVPs are received in every received message, it is highly likely that a previously-received AVP will not be taken into account by PCRF 130 (e.g., some AVPs may be sent only once during a policy session), resulting in inaccurate PCC decisions. Thus, a solution that optimizes attribute persistence and rule evaluation is needed.

The present disclosure provides for an optimization framework that optimizes the amount of information persisted in a policy session using rule introspection. Such an optimization framework is implemented by optimization framework module 190. Optimization framework module 190 performs rule introspection by reviewing the existing decision rules and identifies one or more attribute values that are used as input to the decision rules. Optimization framework module 190 intelligently persists a minimal set of attributes, according to persistence behavior described in a mapping table, as further discussed below. Optimization framework module 190 also performs rule evaluation (substantially) before performing attribute persistence, enabling PCRF's decision-making to be performed as quickly as possible. Optimization framework module 190 thus provides both time (e.g., prioritizes PCRF decision-making to maintain quick PCRF response times) and space (e.g., minimizes the storage space needed to persist attributes) optimizations. Optimization framework module 190 is further discussed below in connection with FIG. 2.

System 100 can utilize Ethernet, IEEE 802.11x, or some other communications protocol. In light of the present disclosure, it will be appreciated that system 100, access network 115, and IP network 120 can include other components such as base stations, access gateways, serving gateways, IP networks, servers, routers, firewalls, and the like that are not germane to the discussion of the present disclosure and will not be discussed further herein. It will also be appreciated that other configurations are possible. For example, additional interfaces that are not shown (but are supported by the 3GPP™ standard) may couple various other PCC system components to PCRF 130. Also, a data store can be implemented using one or more storage devices (e.g., a single storage device or a collection of storage devices). A storage device can be implemented using network attached storage (NAS), file servers, storage filers, a storage area network (SAN), and the like.

Figure 2:
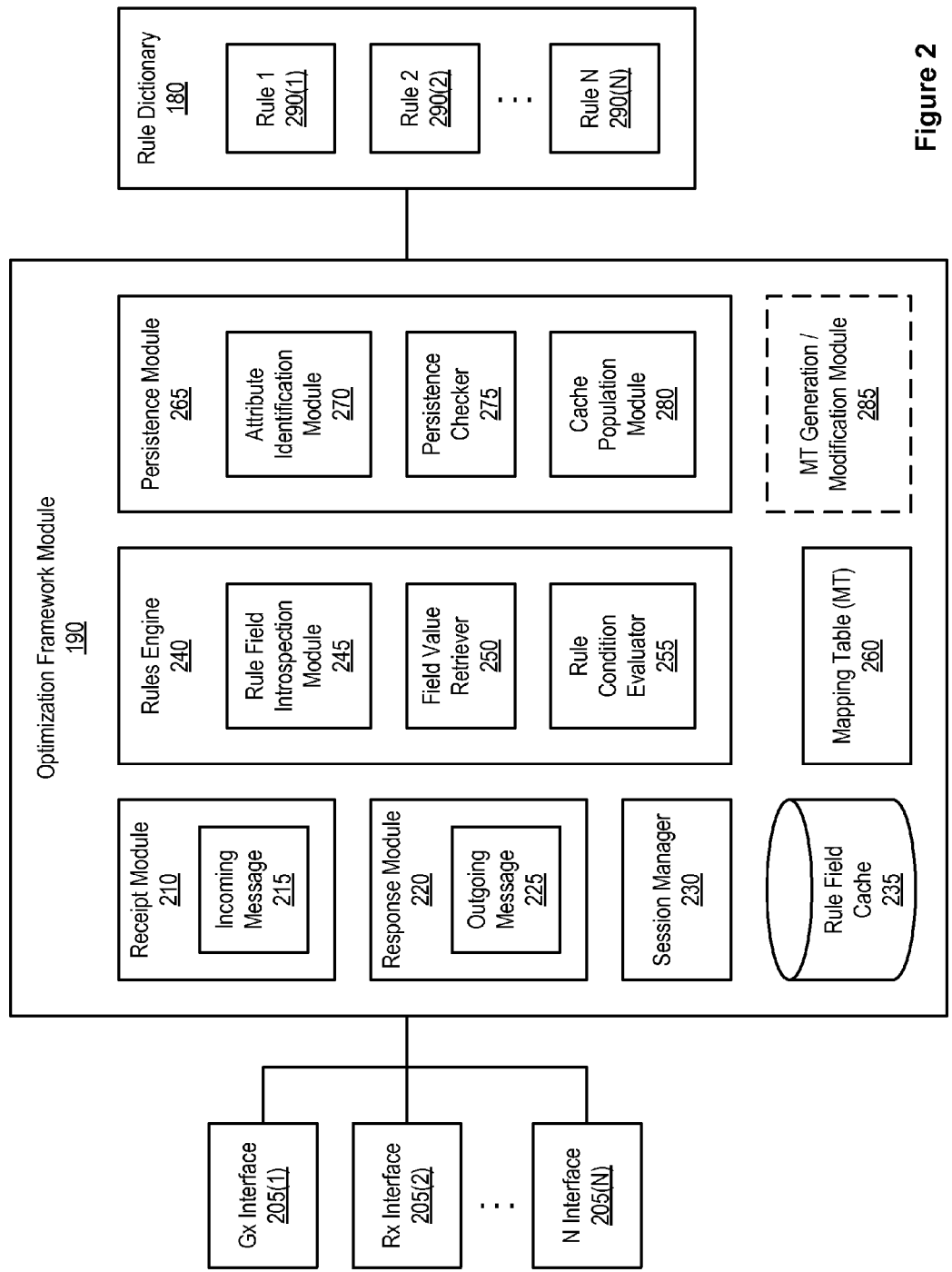
FIG. 2 is a simplified block diagram illustrating components of an example optimization framework module in which the present disclosure can be implemented, according to one embodiment.

FIG. 2 is a simplified block diagram illustrating components of an example optimization framework module 190 in which the present disclosure can be implemented. Optimization framework module 190 is configured to be implemented on PCRF 130 and receive information from a variety of interfaces 205(1)-(N) coupled to PCRF 130. Optimization framework module 190 includes a receipt module 210, a response module 220, a session manager 230, a rules engine 240, and a persistence module 265. Optimization framework module 190 also includes in-memory storage for a rule field cache 235 and a mapping table 260. A mapping table generation/modification module 285 can also be optionally included. Each component is further discussed below.

Receipt module 210 is configured to receive an incoming message 215 from one or more of interfaces 205(1)-(N). Incoming message 215 may include one or more AVPs that in turn include information regarding a subscriber, a requested service, and/or the networks used to deliver the requested service. Incoming message 215 can be an initialization request message for establishing a policy session, an update message regarding a subscriber's service usage and/or updated AVPs, or a termination request message for terminating the policy session. For example, incoming message 215 can be a credit control request message that is received on Gx interface from PCEF 140, where the credit control request message includes information about a subscriber's current service usage and location, equipment information, or other information about the network, such as access type and radio.

Response module 220 is configured to generate and transmit an outgoing message 225 on one or more of interfaces 205(1)-(N). Outgoing message 225 may include one or more AVPs that in turn include information regarding a subscriber, a requested service, and/or the networks used to deliver the requested service. Outgoing message 225 can be a response message to an incoming message, and may include information that informs a subscriber whether a policy session has been established, denied, or terminated, and/or information regarding the subscriber's service usage. For example, outgoing message 225 can be a credit control answer message that is transmitted on Gx interface to PCEF 140, where the credit control answer message includes information that indicates the subscriber has enough credit to continue service usage.

Session manager 230 is configured to manage the policy sessions of the subscribers and manage corresponding portions of rule field cache 235 used during the policy sessions. Rule field cache 235 is a long term in-memory cache that is configured to persist a number of attributes by storing the attributes' AVPs. Each stored AVP is associated with a policy session (e.g., is related to the subscriber and/or the requested service of a policy session). When a policy session is established, session manager 230 is configured to reserve a corresponding portion of rule field cache 235 for persisting attributes associated with the policy session. Session manager 230 is also configured to clear the corresponding portion of rule field cache 235 when the policy session is terminated. Rule field cache 235 is further discussed below in connection with FIG. 4.

Rules engine 240 is configured to perform rule introspection and rule evaluation of decision rules 290(1)-(N) that are stored in rule dictionary 180. Rules engine 240 is configured to perform rule introspection and rule evaluation each time a decision rule changes (e.g., a new rule is added and/or an existing rule is modified or removed), a policy changes (e.g., a new policy is added and/or an existing policy is modified or removed), and/or an updated or new attribute value (e.g., an AVP that includes a new or updated attribute value) is received by PCRF 130 in an incoming message (e.g., in response to receipt of incoming message 215 at receipt module 210). Rules engine 240 includes a rule introspection module 245, a field value retriever 250, and a rule condition evaluator 255.

Rule introspection module 245 is configured to perform rule introspection of decision rules 290(1)-(N) by reviewing the conditions of the decision rules to determine the attributes whose values are used as input to the decision rules. Each decision rule includes a condition, which in turn includes one or more data fields, also referred to as rule fields. Each rule field maps to a corresponding attribute, where the attribute's value is used as input to the rule field. In other words, a rule field of a condition represents an attribute value of a corresponding attribute, acting as a placeholder for the corresponding attribute's value in the condition. Rule fields and attributes can have a one-to-one relationship, a one-to-many relationship, and/or a many-to-one relationship. The mapping of rule fields to attributes is described in mapping table 260 and is defined at design time of the PCC system, as further discussed below.

Rule introspection module 245 is configured to review each condition of the decision rules and identify a set of rule fields that are included in the decision rules (e.g., create a list of rule fields that are used at least once in the conditions of the decision rules). Rule introspection module 245 can also be configured to use the set of rule fields to identify a set of corresponding attributes (e.g., create a list of attributes whose attribute values are used at least once as input to the conditions of the decision rules), such as by consulting mapping table 260.

Rule introspection module 245, field value retriever 250, and rule condition evaluator 255 are configured to cooperatively implement rule evaluation. Rule evaluation may be performed subsequent to rule introspection, or may be performed (substantially) in parallel with rule introspection, as long as rule introspection does not (substantially) delay rule evaluation. Rule introspection module 245 is configured to provide an indication of each identified rule field (e.g., provide a name of a rule field used in the decision rules) to field value retriever 250. Field value retriever 250 is configured to retrieve a corresponding attribute value for each of the identified rule fields. Field value retriever 250 is configured to determine whether the corresponding attribute value for a rule field is present in incoming message 215, and if so, is configured to retrieve the attribute value from the incoming message 215. If field value retriever 250 determines the attribute value is not present in incoming message 215, field value retriever 250 retrieves the attribute value from rule field cache 235. In one embodiment, if the attribute value is not present in incoming message 215 or rule field cache 235, the corresponding rule field may be left blank or a wildcard used (e.g., any value can be used, "don't care" condition), as implemented by the network operator.

Field value retriever 250 is also configured to input the retrieved attribute values into corresponding rule fields in each decision rule condition (e.g., populates or replaces the placeholder rule field with the corresponding attribute value). Rules condition evaluator 255 is configured to evaluate the condition, using the corresponding attribute values. Rules condition evaluator 255 is also configured to provide the resulting Boolean value to PCRF 130, which performs the associated rule action if the Boolean value is true.

Persistence module 265 is configured to persist attributes according to the persistence behavior specified in mapping table 260. Mapping table 260 is an in-memory table (e.g., data structure) configured to store the mapping between rule fields and attributes (where attributes are represented and stored as AVPs). Mapping table 260 includes a number of table entries, with one entry for every (unique) attribute that is defined on an interface coupled to PCRF 130, as defined in the PCC system communications standard. Each entry includes an attribute identifier (such as the attribute's name) and a corresponding rule field identifier (such as the rule field's name), which captures the relationship (or mapping) between the attribute and the rule field. Mapping table 260 also includes metadata that describes the persistence behavior of each attribute. Persistence behavior indicates whether a given attribute should be persisted (or corresponding AVP stored) in an associated policy session. Mapping table 260 is further discussed below in connection with FIG. 3.

Persistence module 265 includes an attribute identification module 270, a persistence checker 275, and a cache population module 280. Attribute identification module 270 is configured to identify one or more attributes (represented as AVPs), in incoming message 215. For each identified attribute, persistence checker 275 is configured to consult mapping table 260 to determine the corresponding persistence behavior (e.g., perform a lookup of the attribute's name in mapping table 260 to find an entry that contains the corresponding persistence behavior). Cache population module 280 is configured to populate rule field cache 235 with attributes' AVPs from incoming message 215, according to the corresponding persistence behavior of the attributes (e.g., corresponding persistence behavior indicates whether an attribute should be persisted in rule field cache 235).

Mapping table generation/modification module 285 is configured to generate and/or modify mapping table 260. In one embodiment, mapping table generation/modification module 285 is provided to the network operator in order for the network operator to generate a default version of mapping table 260 (e.g., during a reset of PCC system 100, generate a mapping table 260 with empty or default persistence behavior), to modify mapping table 260 to include newly defined attributes (e.g., to upgrade PCC system 100 to a newly-released PCC system communications standard that includes new attributes), and/or to modify the existing persistence behavior of an attribute (e.g., change persistence type or persistence mode, as further discussed below). In another embodiment, module 285 is not provided to the network operator. In such an embodiment, mapping table 260 is generated during design time of the PCC system and cannot be modified by the network operator during run time of the PCC system.

The letter N is used to indicate a variable number of devices or components. For example, a variable number of interfaces 205(1)-(N) and rules 290(1)-(N) are implemented in the PCC system 100. Although the letter N is used in describing a variable number of instances of each of these different devices and components, a repeated use of the letter N does not necessarily indicate that each device and component has a same number of N instances implemented in the system.

FIG. 3 is a simplified block diagram illustrating components of an example mapping table 260. Mapping table 260 describes a mapping, or collection of associations, between attributes defined on interfaces 205(1)-(N) and rule fields in the decision rules 290 stored in rules dictionary 180. Rule fields and attributes can have one-to-one, one-to-many, and/or many-to-one associations. Mapping table 260 includes multiple table entries 305(1)-(N). Each entry in mapping table 260 includes an attribute name 310, a rule field name 320, a persistence type 330, and a persistence mode 340. These components are further discussed below.

Attribute name 310 is an identifier of an attribute defined on an interface coupled to PCRF 130. As discussed above, a number of attributes are defined on each interface of interfaces 205(1)-(N), according to the PCC system communications standard. Some attributes have a single value (e.g., AttributeA of interface 1), while other attributes may have a set of one or more values (e.g., AttributeB of interface 1, notated using [1 ... *]). As illustrated, each attribute name 310 includes the name of the interface on which the attribute is defined, indicating that an interface name can be used as a key into a portion of the mapping table that corresponds to the interface.

Rule field name 320 is an identifier of a rule field that is available for use in the decision rules. Rule field names can be defined for the PCC system (e.g., during design time) and are available for use by the network operator to include in conditions of decision rules (e.g., during run time). An association is created between at least one rule field and at least one attribute by storing identifiers of the at least one rule field and the at least one attribute in a single table entry. As illustrated, attribute name 310 of AttributeA is in the same entry 305(1) as rule field name 320 of Field_a, indicating an association between AttributeA and Field_a. Attribute name 310 of AttributeP is in the same entry 305(20) as rule field name 320 of Field_p, indicating an association between AttributeP and Field_p. Other example entries include an entry with a single attribute and multiple rule fields (indicating that the multiple rule fields map to the same attribute), an entry with multiple attributes and a single rule field (indicating that the multiple attributes map to the same rule field, further discussed below regarding custom persistence logic), and an entry with multiple attributes and multiple rule fields (indicating that the multiple attributes map to the multiple rule fields, also further discussed below regarding custom persistence logic).

Rules engine 240 uses the mapping table's associations when evaluating the rules. As discussed above, rule fields represent an associated attribute's value in a decision rule's condition, such as in one or more logical tests of the condition. As illustrated, rule 1 290(1) has a condition (e.g., the IF portion) that includes two logical tests: one that tests whether rule field Field_a of interface 1 (named IF1.Field_a) is equal to a first value (e.g., "Value1"), and another that tests whether rule field Field_p of interface 2 (named IF2.Field_p) is equal to a second value (e.g., "Value2"). Before evaluating the tests, rules engine 240 determines that Field_a is associated with AttributeA (e.g., by consulting mapping table 260). Rules engine 240 retrieves the value of AttributeA (which is retrieved from a received message that includes the AttributeA AVP or from rule field cache 235) and inputs the value of AttributeA into Field_a. Similarly, rules engine 240 determines that Field_p is associated with AttributeP, retrieves the value of AttributeP, and inputs the value of AttributeP into Field_p.

Persistence type 330 indicates the type of persistence behavior defined for the attribute. Supported values are dynamic, always, and never. Dynamic persistence type indicates that the attribute's AVP should be persisted if the attribute's associated rule field is used in the decision rules. An attribute that has dynamic persistence type would be persisted if the attribute were used as input in the decision rules, and would be discarded if the attribute were not used as input in the decision rules. Dynamic persistence type is the default persistence type for all attributes. Always persistence type indicates that the attribute's AVP should always be persisted, regardless of whether the associated rule field is used in the decision rules. Never persistence type indicates that the attribute's AVP should not be persisted in rule field cache 235.

Persistence mode 340 indicates how persistence is performed for the attribute. Supported values are overwrite (the default value), append, and custom. Overwrite persistence mode indicates that a previous attribute value in rule field cache 235 is overwritten (or replaced) in the event a new attribute value is received. Overwrite persistence mode is the default persistence mode for all attributes. Append persistence mode indicates all attribute values are preserved (e.g., a history of values is maintained). In other words, append persistence mode effectively creates a list of attribute values, where a newly-received attribute value (or a set of attribute values) is appended to the list.

Custom persistence mode indicates specific logic should be applied in order to persist the attribute value. For example, a custom persistence mode can be defined for the Event-Trigger attribute on the Gx interface, where some events are not persisted, while other events get appended. Custom persistence mode can identify custom persistence logic that should be used to merge one or more attribute values (either from multiple attributes or from a single attribute that includes one or more values) into a single attribute value, or merge multiple sets of one or more attribute values into a single set of one or more attribute values. Such customization can be helpful in a case where the one or more attributes or attribute values are mutually exclusive. For example, custom persistence logic can define how multiple attributes are persisted as a single value in order to use the single value as input to a single rule field (where the multiple attributes map to the single rule field), or how multiple attributes are persisted as multiple values in order to use the multiple values as input to multiple rule fields (where the multiple attributes map to the multiple rule fields). Custom persistence logic can be stored within a mapping table entry, or can be stored locally with the mapping table (e.g., in-memory storage on PCRF).

Figure 4:
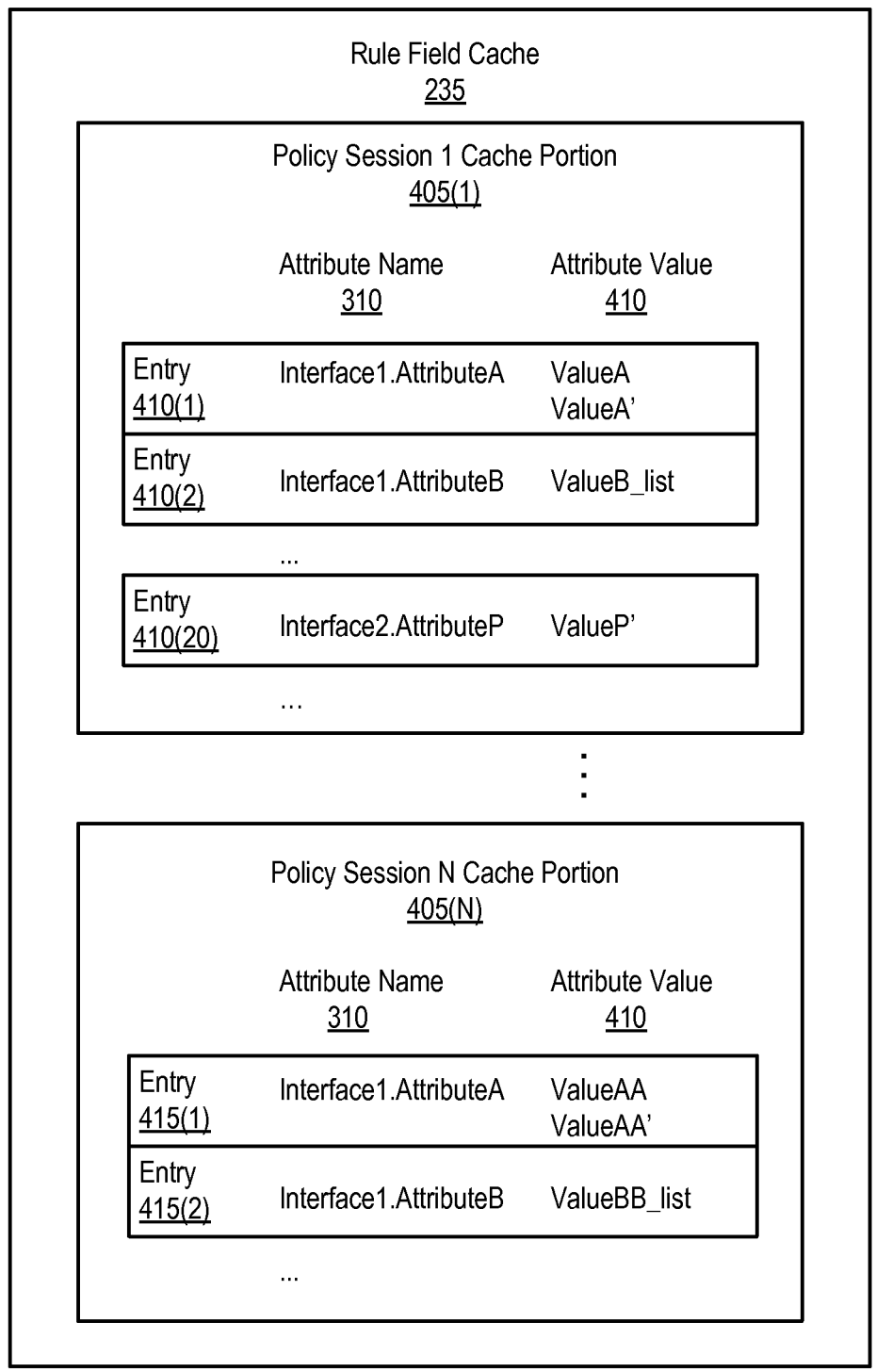
FIG. 4 is a simplified block diagram illustrating components of an example rule field cache, according to one embodiment.

FIG. 4 is a simplified block diagram illustrating components of an example rule field cache 235. Rule field cache 235 persists attributes by storing the attributes' AVPs. Each policy session has a corresponding cache portion 405 in which AVPs related to the policy session are stored. Each cache portion includes a number of cache entries. As illustrated, first policy session cache portion 405(1) includes entries 410(1)-(N) and second policy cache portion 405(N) includes entries 415(A)-(N). Each entry includes an attribute name 310 and associated attribute value 410. Since an attribute name includes the name of the interface on which the attribute is defined, the interface can be used as a key into a portion of the rule field cache that corresponds to the interface.

Rule field cache 235 persists attributes according to the persistence behavior described in mapping table 260. For example, mapping table 260 indicates AttributeA has a persistence type of "dynamic" and persistence mode of "append." The dynamic persistence type indicates that AttributeA should be persisted in rule field cache 235 since AttributeA corresponds to a rule field that is used in the decision rules. Also, the append persistence mode indicates that the new value of AttributeA (illustrated as ValueA') is appended to the existing value stored in the cache (illustrated as ValueA). Similarly, for AttributeP, which has a persistence mode of overwrite, the new value of AttributeP (illustrated as ValueP') overwrites the existing value stored in the cache. Attributes with a persistence mode of "never" are not persisted in rule field cache 235, but instead are discarded. Attributes with a persistence mode of "custom" are persisted in rule field cache 235 according to the logic specified for the attribute.

In one embodiment, rule field cache 235 includes both attribute name 310 and rule field name 320, allowing both the attribute name and rule field name to be used to lookup attribute values in rule field cache 235 (e.g., to use the rule field name to quickly retrieve a corresponding attribute value during rule evaluation). While doing so may eliminate the need to consult mapping table 260 to first determine the attribute corresponding to the rule field (and vice versa), such an embodiment also increases the size of rule field cache 235.

Overall, rule field cache 235 persists a minimal subset of attributes, based on the persistence behavior specified in mapping table 260. In particular, dynamic persistence behavior provides for persisting attributes only if they are used at least once in the decision rules, rather than always persisting all available attributes. Since attributes are selectively persisted, the amount of memory needed to store the attributes is reduced.

Figure 5:
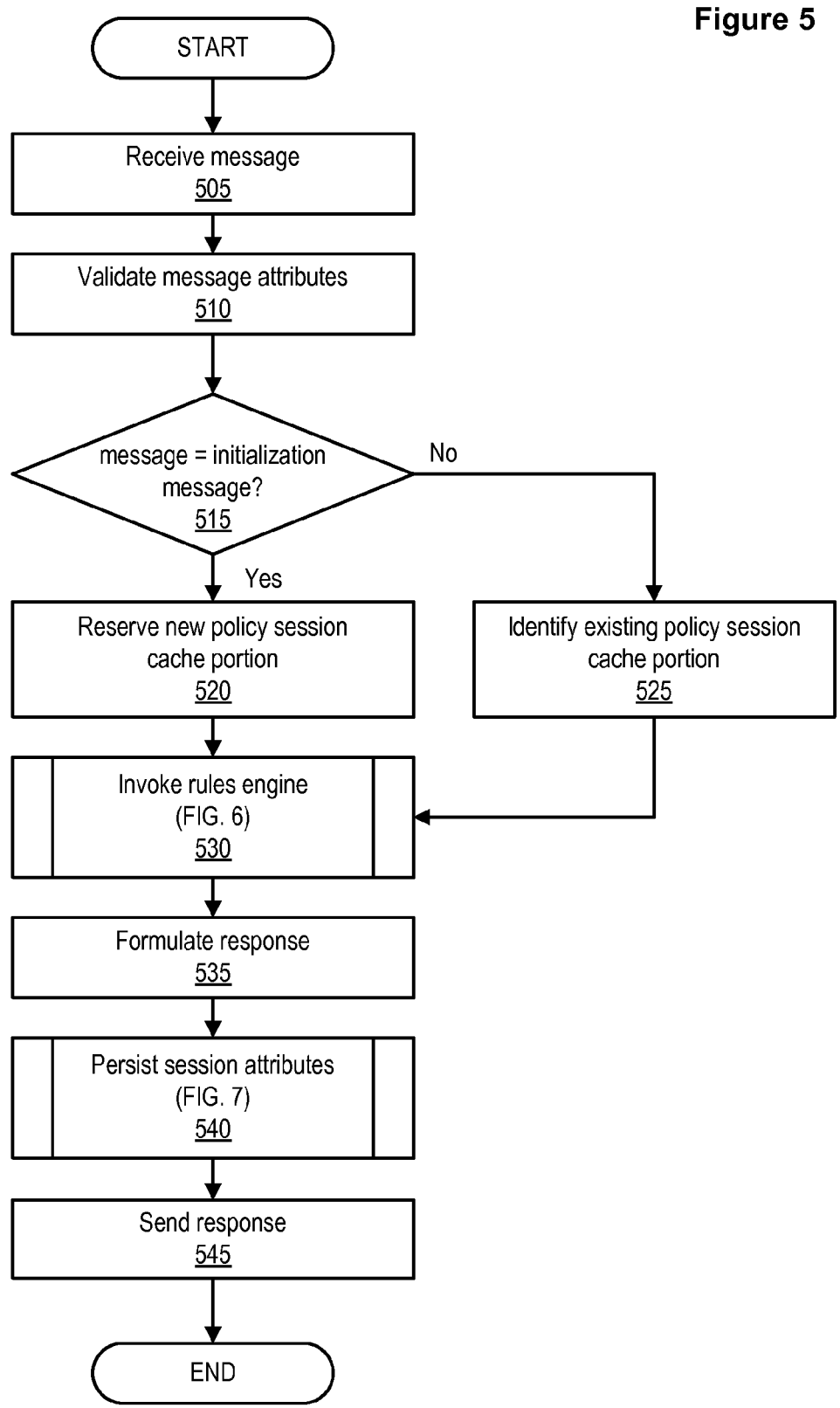
FIG. 5 is a flowchart illustrating an example process implemented by an optimization framework module, according to one embodiment.

FIG. 5 is a flowchart illustrating an example process implemented by an optimization framework module. Optimization framework module 190 is configured to communicate with PCRF 130 to perform various processes, as further discussed below. The process illustrated in FIG. 5 starts at operation 505, where a receipt module of the optimization framework module receives a message from a PCC system component. The receipt module detects when an incoming message is received on a port of PCRF's computing device that is coupled to the PCC system component, and receives the incoming message (or information contained therein). The process continues to operation 510, where the receipt module validates the attributes contained in the message. Validation can include checking whether the attribute names match the naming convention provided in the PCC system communications standard, whether any errors are detected in the message, and the like.

The process continues to operation 515, where a session manager of the optimization framework module determines whether the message is a session initialization message. If the message is an initialization message, the process continues to operation 520, where the session manager uses information in the initialization message to establish a new policy session (associated with a subscriber and a service). The session manager also reserves a cache portion for the new policy session in the rule field cache. The process then continues to operation 530.

Returning to operation 515, if the message is not a session initialization message, the process continues to operation 525, where the session manager uses information in the message to identify an existing policy session. The session manager also identifies an existing cache portion of the existing policy session in the rule field cache. The process then continues to operation 530.

At operation 530, the rules engine is invoked to perform rule introspection and rule evaluation of the decision rules stored in the rule dictionary. Operation 530 is further discussed below in connection with FIG. 6. The process continues to operation 535, where a response module of the optimization framework module formulates a response, which may include information about the subscriber and/or service of the policy session. The process continues to operation 540, where a persistence module of the optimization framework module persists attributes related to the policy session in the rule field cache. Operation 540 is further discussed below in connection with FIG. 7.

The process continues to operation 545, where the response module sends the response toward a PCC system component. The response module sends an outgoing message on a port of PCRF's computing device that is coupled to the PCC system component. It is noted that operation 540 can be performed subsequent to operations 530 and 535, or can be performed (substantially) in parallel with operations 530, 535, and 545, as long as operation 540 does not (substantially) delay operations 530, 535, and 545. The process then ends.

Figure 6:
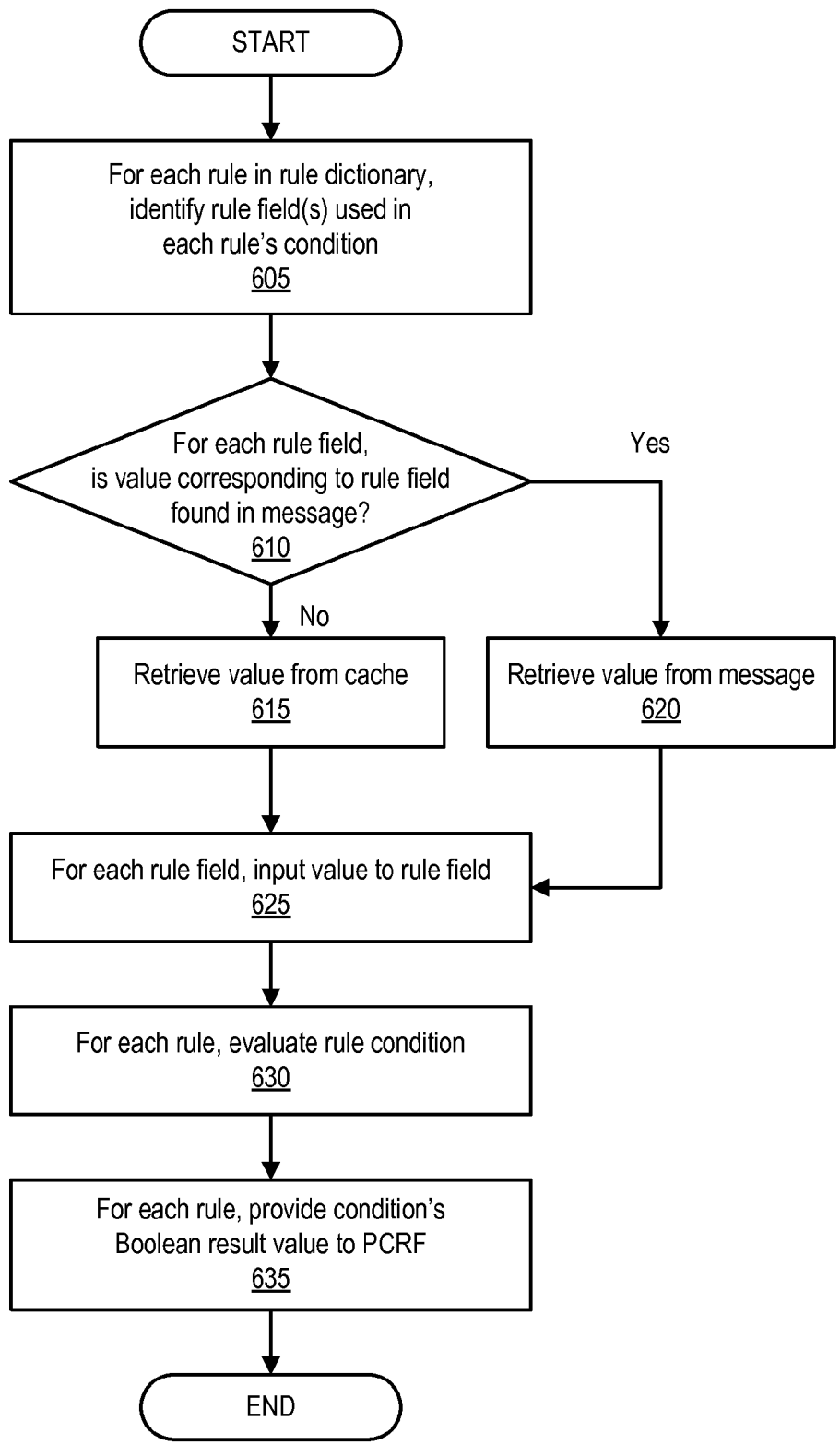
FIG. 6 is a flowchart illustrating an example rule introspection and rule evaluation process implemented by an optimization framework module, according to one embodiment.

FIG. 6 is a flowchart illustrating an example rule introspection and rule evaluation process implemented by an optimization framework module. The process illustrated in FIG. 6 can be performed in response to receipt of a message (as illustrated in FIG. 5), or in response to any changes made to the decision rules and/or policies. The process illustrated in FIG. 6 starts at operation 605, where a rule field introspection module of the optimization framework module identifies, for each decision rule in the rule dictionary, one or more rule fields used in each decision rule's condition. In one embodiment, rule field introspection module produces a master list of identified rule fields used in the decision rules and provides this master list to a field value retriever of the optimization framework module.

The process continues to operation 610, where the field value retriever determines, for each identified rule field, whether an attribute value that corresponds to the identified rule field is found in the received message. The field value retriever performs a lookup of the identified rule field's name in a mapping table, where the mapping table indicates that the identified rule field is associated with a particular attribute. The field value retriever then uses the particular attribute's name to identify whether an AVP that contains this attribute name is present in the received message. If the AVP is present in the received message, the attribute value is determined to be found in the received message (since an AVP includes both an attribute name and associated attribute value), and the process continues to operation 620, where the attribute value is retrieved from the message. The process then continues to operation 625.

Returning to operation 610, if the AVP is not present in the received message, the attribute value is not found in the received message, and the process continues to operation 615, where the field value retriever retrieves the attribute value from the rule field cache. In one embodiment, the field value retriever performs a lookup in the rule field cache using the attribute name previously determined from the mapping table to retrieve the attribute value associated with the attribute name. In another embodiment, the field value retriever performs a lookup in the rule field cache using the identified rule field name to retrieve the attribute value associated with the identified rule field name. The process then continues to operation 625.

At operation 625, the field value retriever inputs, for each rule field, the retrieved attribute value into the identified rule field. The process continues to operation 630, where a rule condition evaluator of the optimization framework module evaluates the rule condition for each rule. The process continues to operation 635, where the rule condition evaluator provides, for each rule, the rule condition's Boolean result value to PCRF. In another embodiment, the rule condition evaluator only provides true result values to PCRF, indicating to PCRF that the one or more actions associated with the true condition should be performed. The process then ends.

Figure 7:
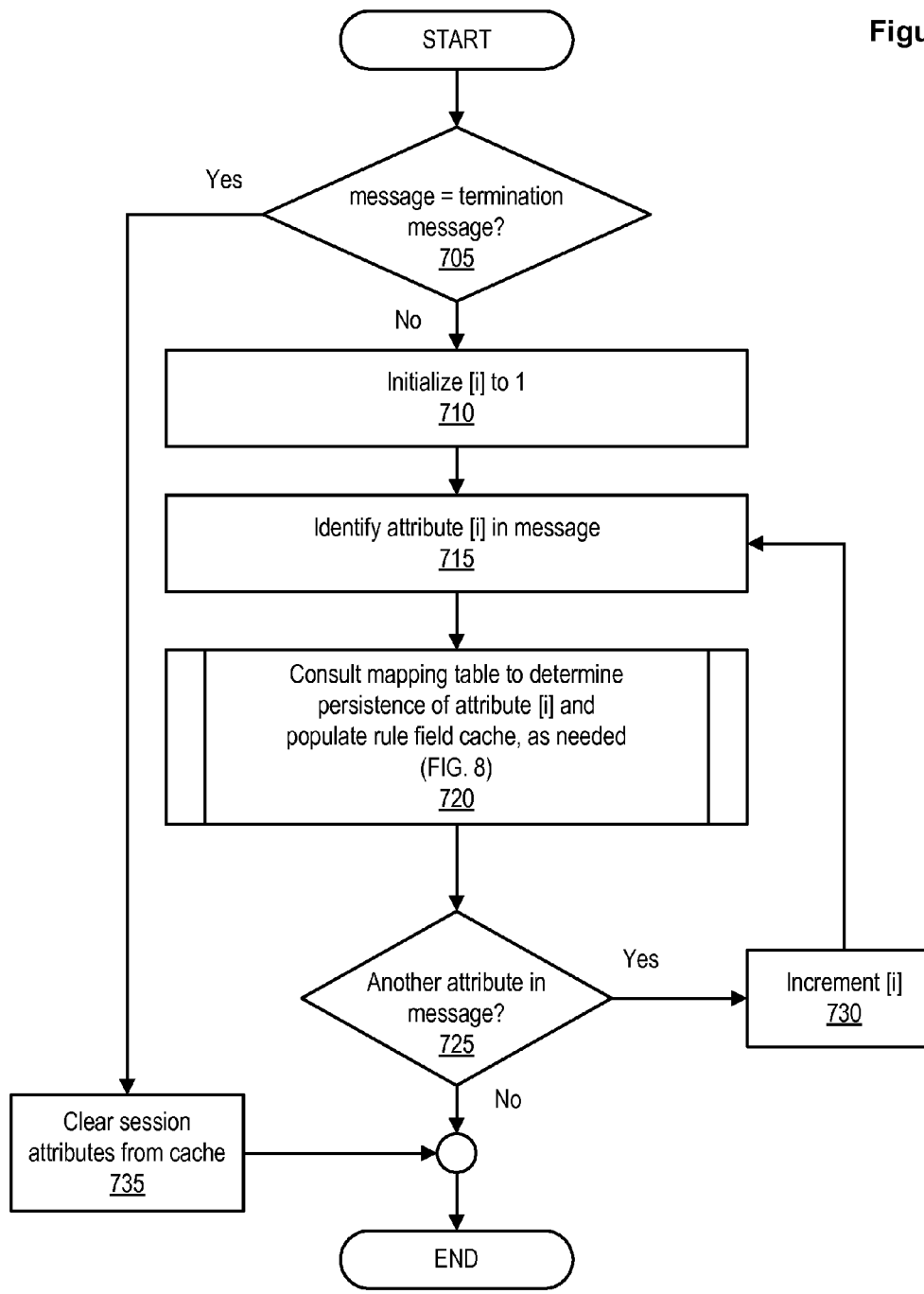
FIGS. 7 and 8 are flowcharts illustrating an example persistence process implemented by an optimization framework module, according to one embodiment.

FIG. 7 is a flowchart illustrating an example persistence process implemented by an optimization framework module. The process illustrated in FIG. 7 starts at operation 705, where the session manager determines whether the message is a session termination message. If the message is a termination message, the process continues to operation 735, where session manager clears the cache portion corresponding to the policy session from the rule field cache. Since the policy session is being terminated, the attributes of the policy session no longer need to be persisted. The cache portion corresponding to the policy session should not be cleared until after rule evaluation using the cache portion has completed (e.g., when persistence is performed substantially in parallel with rule evaluation). The process then ends.

Returning to operation 705, if the message is not a session termination message, the process continues to operation 710, where an attribute identification module of optimization framework module initializes an attribute counter [i] to one (1). The process then continues to operation 715, where the attribute identification module identifies attribute [i] in the received message. The process continues to operation 720, where a persistence checker of the optimization framework module consults a mapping table to determine persistence of attribute [i]. A cache population module of the optimization framework module also updates the rule field cache, as needed. Operation 720 is further discussed below in connection with FIG. 8.

The process continues to operation 725, where the attribute identification module determines whether there is another attribute in the received message. If so, the attribute identification module increments the attribute counter [i] in operation 730, and the process returns to operation 715. If there are no other attributes in the received message, the process ends.

Figure 8:
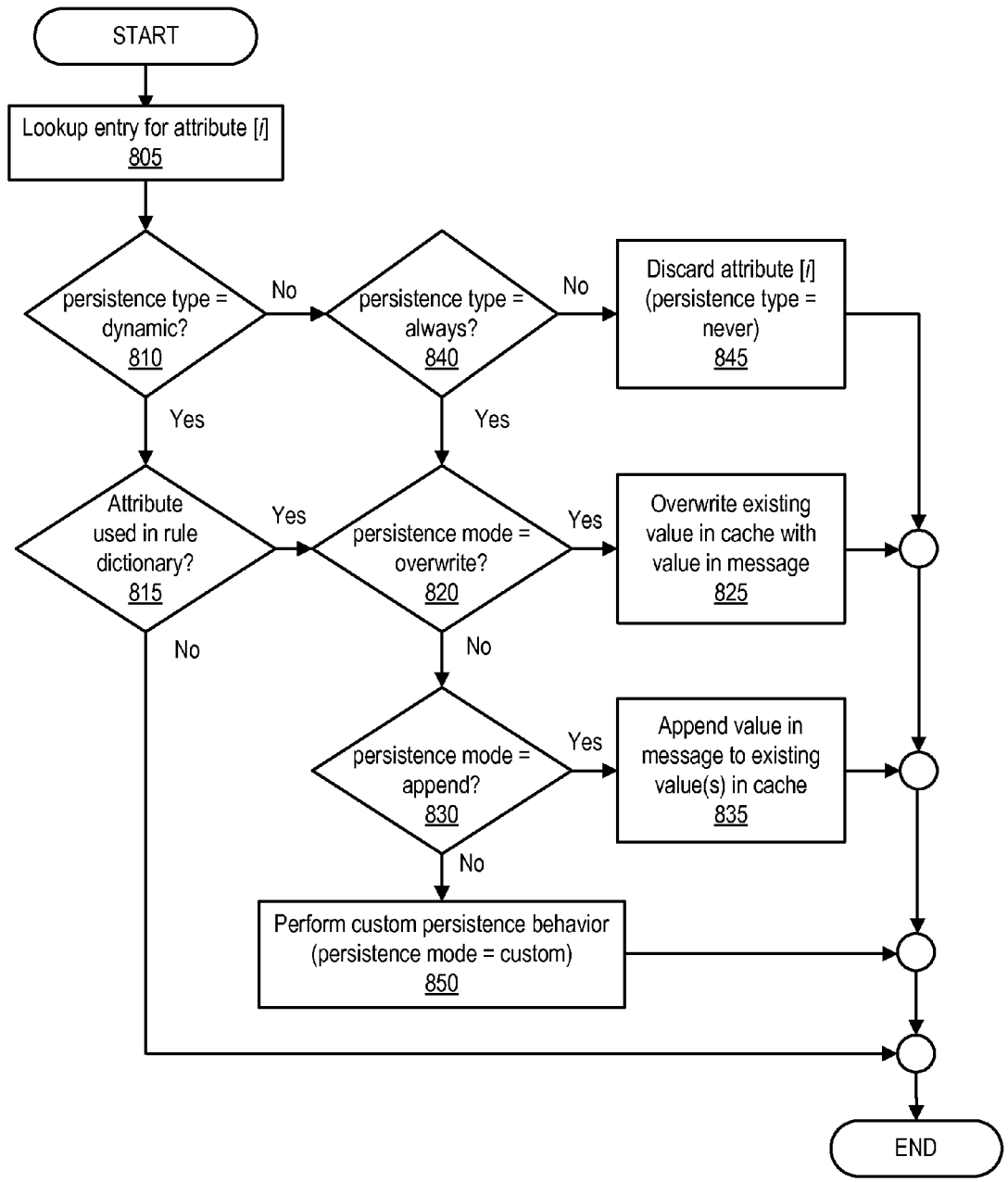

FIG. 8 is a flowchart illustrating an example persistence process implemented by an optimization framework module. The process illustrated in FIG. 8 starts at operation 805, where the persistence checker uses attribute [i]'s attribute name to perform a lookup in the mapping table to locate attribute [i]'s mapping table entry. The process continues to operation 810, where the persistence checker determines if attribute [i]'s mapping table entry includes a persistence type of dynamic. If so, the process continues to operation 815, where the persistence checker determines if attribute [i] is used in the rule dictionary (e.g., whether attribute [i]'s value is used as an input to a rule field in a decision rule in the rule dictionary). In one embodiment, the persistence checker can determine if the attribute [i] is associated with a rule field that is present on the master list of identified rule fields. If not, attribute [i] should not be persisted and the process then ends.

Returning to operation 815, if attribute [i] is used as input to a decision rule in the rule dictionary, the process continues to operation 820, where the persistence checker determines if attribute [i]'s mapping table entry includes a persistence mode of overwrite. If so, the process continues to operation 825, where the cache population module overwrites any existing attribute value in the current policy session's cache portion of the rule field cache with the value retrieved from the message. The process then ends.

Returning to operation 820, if attribute [i]'s mapping table entry does not include a persistence mode of overwrite, the process continues to operation 830. At operation 830, the persistence checker determines whether attribute [i]'s mapping table entry includes a persistence mode of append. If so, the process continues to operation 835, where the cache population module appends the value retrieved from the message to any existing values in the current policy session's cache portion of the rule field cache. The process then ends.

Returning to operation 830, if attribute [i]'s mapping table entry does not include a persistence mode of append, the process continues to operation 850. At operation 850, the persistence checker determines that persistence mode of attribute [i]'s mapping table entry is custom, and the cache population module performs custom persistence behavior of attribute [i]. The process then ends.

Returning to operation 810, if attribute [i]'s mapping table entry does not include a persistence type of dynamic, the process continues to operation 840. At operation 840, the persistence checker determines whether attribute [i]'s mapping table entry includes a persistence type of always. If so, the process continues to operation 820, as discussed above.

Returning to operation 840, if attribute [i]'s mapping table entry does not include a persistence type of always, the process continues to operation 845. At operation 845, the persistence checker determines that persistence type of attribute [i]'s mapping table entry is never, indicating that the attribute [i] should be discarded (and should not be persisted), and the process then ends.

An Example Computing and Network Environment

As shown above, the present invention can be implemented using a variety of computer systems and networks. An example of one such computing and network environment is described below with reference to FIGS. 9 and 10.

Figure 9:
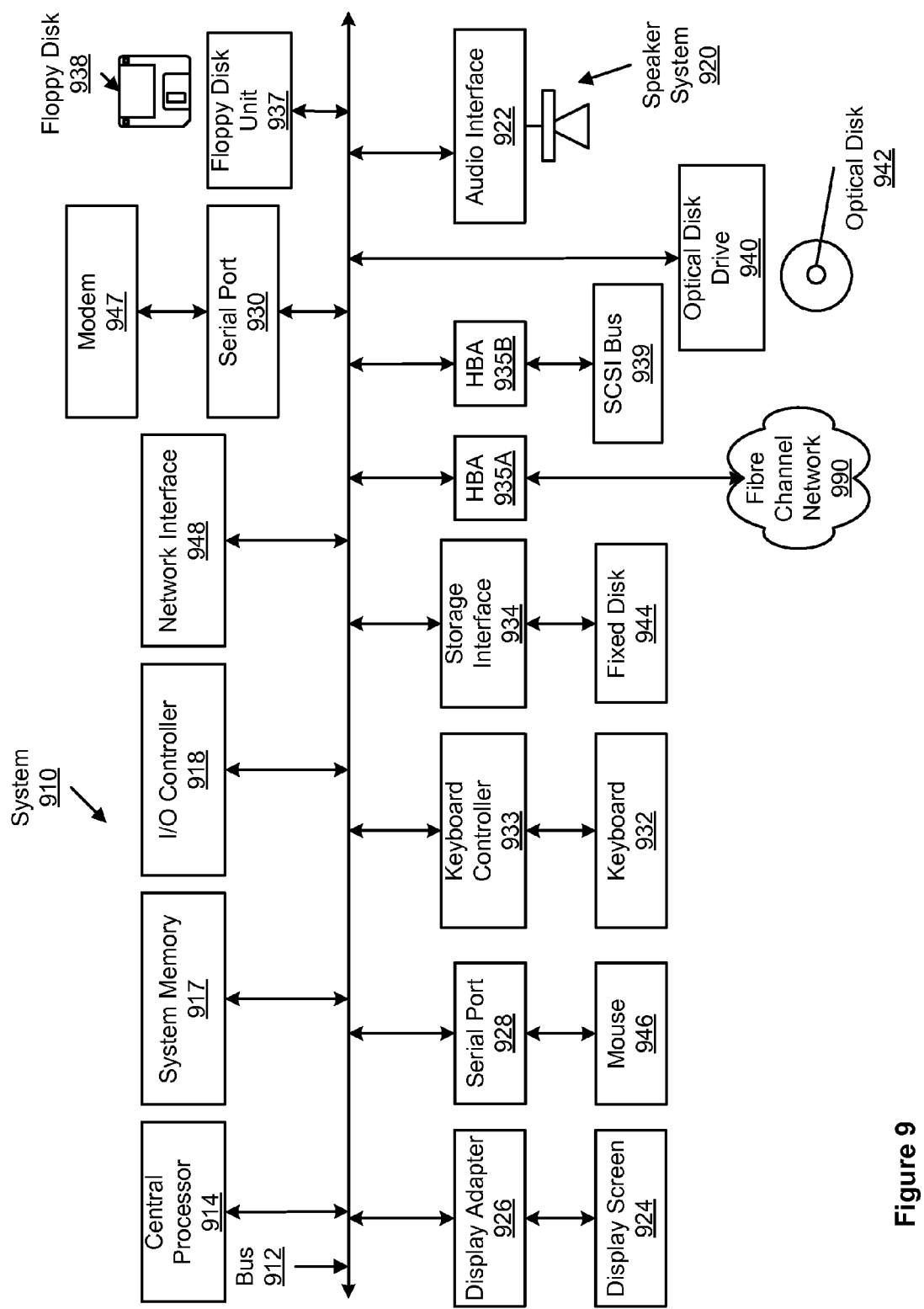
FIG. 9 is a simplified block diagram of a computer system suitable for implementing aspects of the present disclosure, according to one embodiment.

FIG. 9 depicts a block diagram of a computer system 910 suitable for implementing aspects of the present invention (e.g., for implementing computing devices for implementing various PCC system components, such as user equipment 110, gateway 145, PCRF 130, AF 150, OCS 465 and/or end point 125). Computer system 910 includes a bus 912 which interconnects major subsystems of computer system 910, such as a central processor 914, a system memory 917 (typically RAM, but which may also include ROM, flash RAM, or the like), an input/output controller 918, an external audio device, such as a speaker system 920 via an audio output interface 922, an external device, such as a display screen 924 via display adapter 926, serial ports 928 and 930, a keyboard 932 (interfaced with a keyboard controller 933), a storage interface 934, a floppy disk drive 937 operative to receive a floppy disk 938, a host bus adapter (HBA) interface card 935A operative to connect with a Fibre Channel network 990, a host bus adapter (HBA) interface card 935B operative to connect to a SCSI bus 939, and an optical disk drive 940 operative to receive an optical disk 942. Also included are a mouse 946 (or other point-and-click device, coupled to bus 912 via serial port 928), a modem 947 (coupled to bus 912 via serial port 930), and a network interface 948 (coupled directly to bus 912).

Bus 912 allows data communication between central processor 914 and system memory 917, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 910 are generally stored on and accessed via a computer-readable medium, such as a hard disk drive (e.g., fixed disk 944), an optical drive (e.g., optical drive 940), a floppy disk unit 937, or other storage medium. Additionally, applications can be in the form of electronic signals modulated in accordance with the application and data communication technology when accessed via network modem 947 or interface 948.

Storage interface 934, as with the other storage interfaces of computer system 910, can connect to a standard computer-readable medium for storage and/or retrieval of information, such as a fixed disk drive 944. Fixed disk drive 944 may be a part of computer system 910 or may be separate and accessed through other interface systems. Modem 947 may provide a direct connection to a remote server via a telephone link or to the Internet via an internet service provider (ISP). Network interface 948 may provide a direct connection to a remote server via a direct network link to the Internet via a POP (point of presence). Network interface 948 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present invention. The devices and subsystems can be interconnected in different ways from that shown in FIG. 9. The operation of a computer system such as that shown in FIG. 9 is readily known in the art and is not discussed in detail in this application. Code to implement the present invention can be stored in computer-readable storage media such as one or more of system memory 917, fixed disk 944, optical disk 942, or floppy disk 938. The operating system provided on computer system 910 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 10:
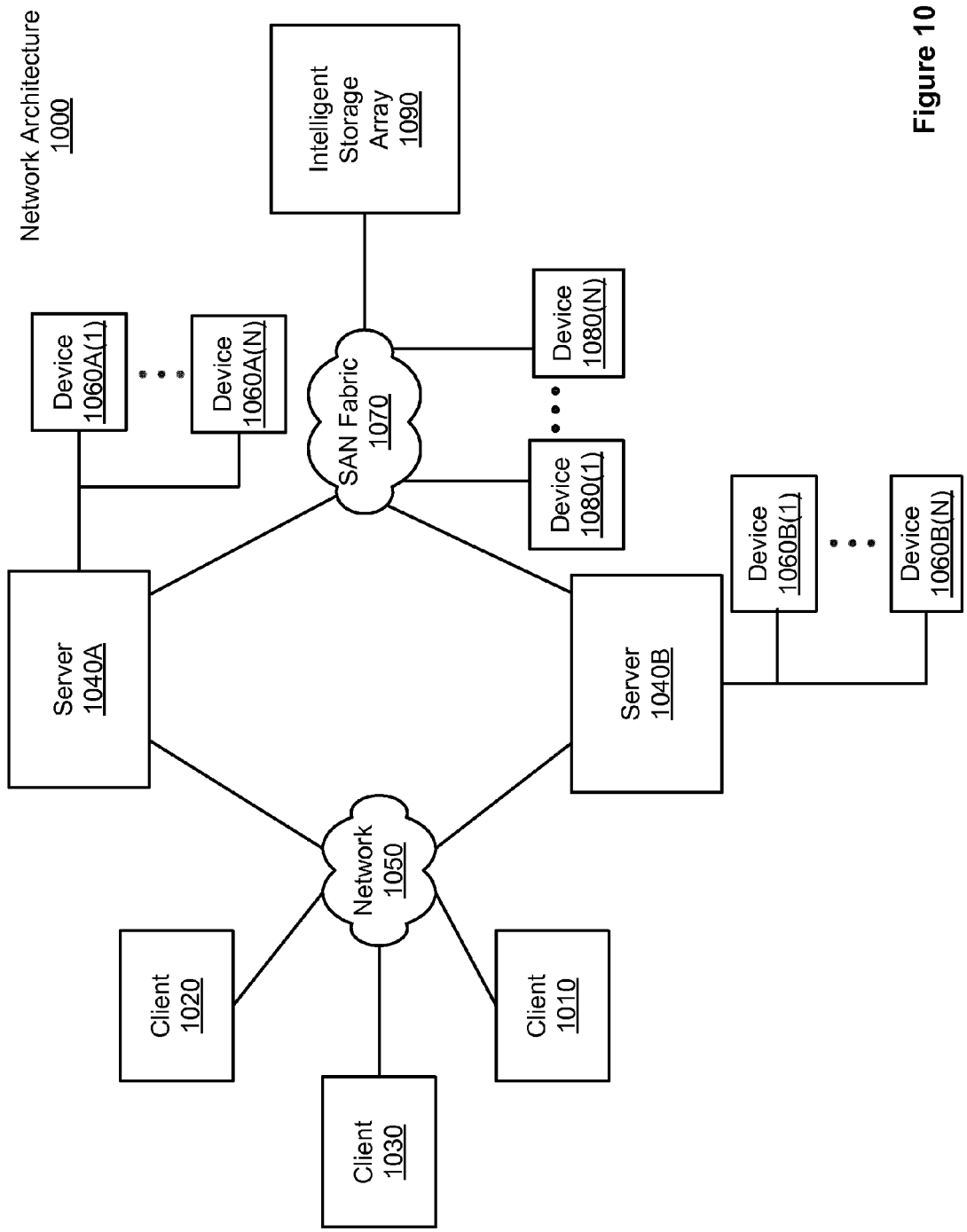
FIG. 10 is a simplified block diagram of a network architecture suitable for implementing aspects of the present disclosure, according to one embodiment.

FIG. 10 is a block diagram depicting a network architecture 1000 in which client systems 1010, 1020 and 1030, as well as storage servers 1040A and 1040B (any of which can be implemented using computer system 910), are coupled to a network 1050. Storage server 1040A is further depicted as having storage devices 1060A(1)-(N) directly attached, and storage server 1040B is depicted with storage devices 1060B(1)-(N) directly attached. Storage servers 1040A and 1040B are also connected to a SAN fabric 1070, although connection to a storage area network is not required for operation of the invention. SAN fabric 1070 supports access to storage devices 1080(1)-(N) by storage servers 1040A and 1040B, and so by client systems 1010, 1020 and 1030 via network 1050. Intelligent storage array 1090 is also shown as an example of a specific storage device accessible via SAN fabric 1070.

With reference to computer system 910, modem 947, network interface 948 or some other method can be used to provide connectivity from each of client computer systems 1010, 1020 and 1030 to network 1050. Client systems 1010, 1020 and 1030 are able to access information on storage server 1040A or 1040B using, for example, a web browser or other client software (not shown). Such a client allows client systems 1010, 1020 and 1030 to access data hosted by storage server 1040A or 1040B or one of storage devices 1060A(1)-(N), 1060B(1)-(N), 1080(1)-(N) or intelligent storage array 1090. FIG. 10 depicts the use of a network such as the Internet for exchanging data, but the present invention is not limited to the Internet or any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 910). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof, including the specialized system illustrated in FIG. 1.

The present invention has been described in the context of fully functional computer systems; however, those skilled in the art will appreciate that the present invention is capable of being distributed as a program product in a variety of forms, and that the present invention applies equally regardless of the particular type of computer-readable media used to actually carry out the distribution. Examples of computer-readable media include computer-readable storage media, as well as media storage and distribution systems developed in the future.

The above-discussed embodiments can be implemented by software modules that perform one or more tasks associated with the embodiments. The software modules discussed herein may include script, batch, or other executable files. The software modules may be stored on a machine-readable or computer-readable storage media such as magnetic floppy disks, hard disks, semiconductor memory (e.g., RAM, ROM, and flash-type media), optical discs (e.g., CD-ROMs, CD-Rs, and DVDs), or other types of memory modules. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   receiving a message that comprises an attribute, wherein the attribute comprises an attribute name and an attribute value;
   consulting a mapping table to determine persistence behavior associated with the attribute name; and
   persisting the attribute in a cache, according to the persistence behavior,
   wherein persisting the attribute according to the persistence behavior comprises at least one of:
   (a) subsequent to determining that the persistence behavior comprises a dynamic persistence type:
      determining whether the attribute is used as input to any decision rule in a rule dictionary; and
      persisting the attribute in the cache in response to determining that the attribute is used as input to at least one decision rule in the rule dictionary;
   (b) subsequent to determining that the persistence behavior comprises an overwrite persistence mode, overwriting an existing attribute value in the cache with said attribute value;
   (c) subsequent to determining that the persistence behavior comprises an append persistence mode, appending said attribute value to the existing attribute value;
   (d) subsequent to determining that the persistence behavior comprises an always persistence type, storing or maintaining the attribute in the cache;
   (e) subsequent to determining that the persistence behavior comprises a never persistence type, refraining from maintaining the attribute in the cache; or
   (f) subsequent to determining that the persistence behavior comprises a custom persistence mode, populating the cache according to custom persistence logic, identified by the mapping table, which specifies how the attribute should be persisted;
   wherein the method is executed by at least one device comprising a hardware processor.

2. The method of claim 1, wherein persisting the attribute comprises:
   (a) subsequent to determining that the persistence behavior comprises the dynamic persistence type:
      determining whether the attribute is used as input to any decision rule in the rule dictionary; and
      persisting the attribute in the cache in response to determining that the attribute is used as input to the at least one decision rule in the rule dictionary.

3. The method of claim 1, wherein persisting the attribute comprises at least one of:
   (b) subsequent to determining that the persistence behavior comprises an overwrite persistence mode, overwriting an existing attribute value in the cache with said attribute value.

4. The method of claim 1, wherein persisting the attribute comprises:
   (c) subsequent to determining that the persistence behavior comprises an append persistence mode, appending said attribute value to the existing attribute value.

5. The method of claim 1, wherein persisting the attribute comprises:
   (d) subsequent to determining that the persistence behavior comprises an always persistence type, storing or maintaining the attribute in the cache.

6. The method of claim 1, wherein persisting the attribute comprises:
   (e) subsequent to determining that the persistence behavior comprises a never persistence type, refraining from maintaining the attribute in the cache.

7. The method of claim 1, wherein persisting the attribute comprises:
   (f) subsequent to determining that the persistence behavior comprises a custom persistence mode, populating the cache according to custom persistence logic, identified by the mapping table, which specifies how the attribute should be persisted.

8. A non-transitory computer readable storage medium configured to store program instructions that, when executed on a processor, are configured to cause the processor to perform operations comprising:
   receiving a message that comprises an attribute, wherein the attribute comprises an attribute name and an attribute value;
   consulting a mapping table to determine persistence behavior associated with the attribute name; and
   persisting the attribute in a cache, according to the persistence behavior,
   wherein persisting the attribute according to the persistence behavior comprises at least one of:
   (a) subsequent to determining that the persistence behavior comprises a dynamic persistence type:
   determining whether the attribute is used as input to any decision rule in a rule dictionary; and
   persisting the attribute in the cache in response to determining that the attribute is used as input to at least one decision rule in the rule dictionary;
   (b) subsequent to determining that the persistence behavior comprises an overwrite persistence mode, overwriting an existing attribute value in the cache with said attribute value;
   (c) subsequent to determining that the persistence behavior comprises an append persistence mode, appending said attribute value to the existing attribute value;
   (d) subsequent to determining that the persistence behavior comprises an always persistence type, storing or maintaining the attribute in the cache;
   (e) subsequent to determining that the persistence behavior comprises a never persistence type, refraining from maintaining the attribute in the cache; or
   (f) subsequent to determining that the persistence behavior comprises a custom persistence mode, populating the cache according to custom persistence logic, identified by the mapping table, which specifies how the attribute should be persisted.

9. The non-transitory computer readable storage medium of claim 8, wherein persisting the attribute comprises:
   (a) subsequent to determining that the persistence behavior comprises the dynamic persistence type:
   determining whether the attribute is used as input to any decision rule in the rule dictionary; and
   persisting the attribute in the cache in response to determining that the attribute is used as input to the at least one decision rule in the rule dictionary.

10. The non-transitory computer readable storage medium of claim 8, wherein persisting the attribute comprises:
    (b) subsequent to determining that the persistence behavior comprises the overwrite persistence mode, overwriting the existing attribute value in the cache with said attribute value.

11. The non-transitory computer readable storage medium of claim 8, wherein persisting the attribute comprises:
    (c) subsequent to determining that the persistence behavior comprises the append persistence mode, appending said attribute value to the existing attribute value.

12. The non-transitory computer readable storage medium of claim 8, wherein persisting the attribute comprises:
    (d) subsequent to determining that the persistence behavior comprises the always persistence type, storing or maintaining the attribute in the cache.

13. The non-transitory computer readable storage medium of claim 8, persisting the attribute comprises:
    (e) subsequent to determining that the persistence behavior comprises the never persistence type, refraining from maintaining the attribute in the cache.

14. The non-transitory computer readable storage medium of claim 8, wherein persisting the attribute comprises:
    (f) subsequent to determining that the persistence behavior comprises the custom persistence mode, populating the cache according to custom persistence logic, identified by the mapping table, which specifies how the attribute should be persisted.

15. An apparatus comprising:
    a processor; and
    a memory coupled to the processor and configured to store instructions, executable by the processor, for performing operations comprising:
    receiving a message that comprises an attribute, wherein the attribute comprises an attribute name and an attribute value;
    consulting a mapping table to determine persistence behavior associated with the attribute name; and
    persisting the attribute in a cache, according to the persistence behavior,
    wherein persisting the attribute according to the persistence behavior comprises at least one of:
    (a) subsequent to determining that the persistence behavior comprises a dynamic persistence type:
    determining whether the attribute is used as input to any decision rule in a rule dictionary; and
    persisting the attribute in the cache in response to determining that the attribute is used as input to at least one decision rule in the rule dictionary;
    (b) subsequent to determining that the persistence behavior comprises an overwrite persistence mode, overwriting an existing attribute value in the cache with said attribute value;
    (c) subsequent to determining that the persistence behavior comprises an append persistence mode, appending said attribute value to the existing attribute value;
    (d) subsequent to determining that the persistence behavior comprises an always persistence type, storing or maintaining the attribute in the cache;
    (e) subsequent to determining that the persistence behavior comprises a never persistence type, refraining from maintaining the attribute in the cache; or
    (f) subsequent to determining that the persistence behavior comprises a custom persistence mode, populating the cache according to custom persistence logic, identified by the mapping table, which specifies how the attribute should be persisted.

16. The apparatus of claim 15, wherein persisting the attribute comprises:
   (a) subsequent to determining that the persistence behavior comprises the dynamic persistence type:
      determining whether the attribute is used as input to any decision rule in the rule dictionary; and
      persisting the attribute in the cache in response to determining that the attribute is used as input to the at least one decision rule in the rule dictionary.

17. The apparatus of claim 15, wherein persisting the attribute comprises:
   (b) subsequent to determining that the persistence behavior comprises the overwrite persistence mode, overwriting the existing attribute value in the cache with said attribute value.

18. The apparatus of claim 15, wherein persisting the attribute comprises:
   (c) subsequent to determining that the persistence behavior comprises the append persistence mode, appending said attribute value to the existing attribute value.

19. The apparatus of claim 15, wherein persisting the attribute comprises:
   (d) subsequent to determining that the persistence behavior comprises the always persistence type, storing or maintaining the attribute in the cache.

20. The apparatus of claim 15, wherein persisting the attribute comprises:
   (e) subsequent to determining that the persistence behavior comprises the never persistence type, refraining from maintaining the attribute in the cache.

21. The apparatus of claim 15, wherein persisting the attribute comprises:
   (f) subsequent to determining that the persistence behavior comprises the custom persistence mode, populating the cache according to custom persistence logic, identified by the mapping table, which specifies how the attribute should be persisted.

\* \* \* \* \*